ROUND TH' CLOCK CLEANERS

Original Filed Nov. 16, 1961 7 Sheets-Sheet 1

INVENTOR.
HARRY D. FORSE
BY

ROUND TH' CLOCK CLEANERS

Original Filed Nov. 16, 1961 7 Sheets-Sheet 2

INVENTOR.
HARRY D. FORSE
BY

ROUND TH' CLOCK CLEANERS
Original Filed Nov. 16, 1961 7 Sheets-Sheet 3
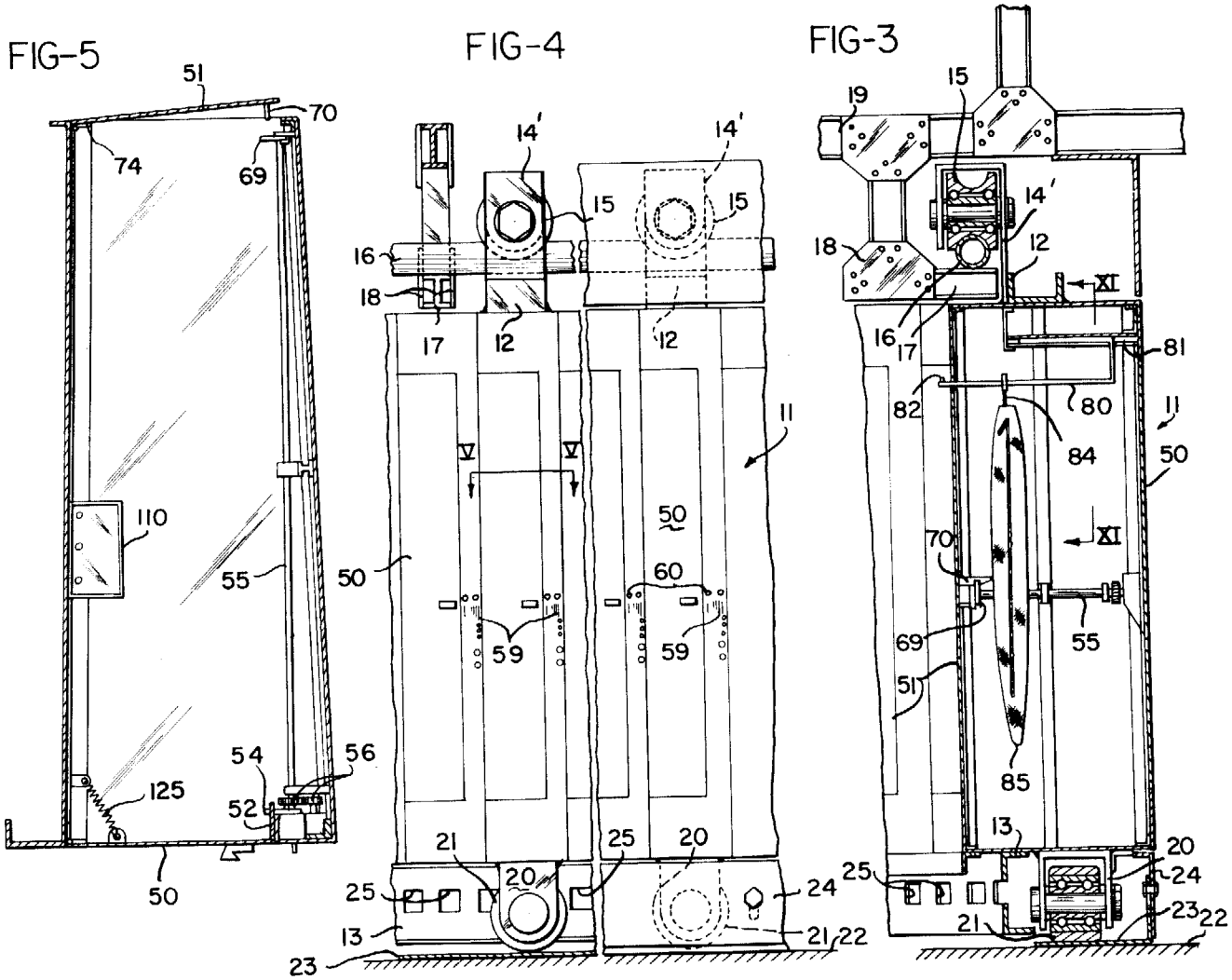
INVENTOR.
HARRY D. FORSE
BY

ROUND TH' CLOCK CLEANERS

Original Filed Nov. 16, 1961 7 Sheets-Sheet 4

INVENTOR.
HARRY D. FORSE
BY

ROUND TH' CLOCK CLEANERS

Original Filed Nov. 16, 1961 7 Sheets-Sheet 5

INVENTOR.
HARRY D. FORSE
BY

ROUND TH' CLOCK CLEANERS

Original Filed Nov. 16, 1961 7 Sheets-Sheet 6

INVENTOR.
HARRY D. FORSE
BY

ROUND TH' CLOCK CLEANERS

Original Filed Nov. 16, 1961 7 Sheets-Sheet 7

INVENTOR.
HARRY D. FORSE
BY

United States Patent Office

Re. 26,002
Reissued Apr. 26, 1966

26,002
ROUND TH' CLOCK CLEANERS

Harry D. Forse, 220 Woods Road, Edgewood, Anderson, Ind.

Original No. 3,149,708, dated Sept. 22, 1964, Ser. No. 152,784, Nov. 16, 1961. Application for reissue Sept. 22, 1965, Ser. No. 490,170
16 Claims. (Cl. 194—1)

Matter enclosed in heavy brackets [ ] appears in the original patent but forms no part of this reissue specification; matter printed in italics indicates the additions made by reissue.

This invention relates to a method and apparatus for handling articles that are to be treated through such processes as cleaning, spotting, pressing or laundering, and is particularly concerned with such an arrangement for the handling of clothing, and the like, in dry cleaning establishments.

In the usual dry cleaning establishment where articles of clothing are taken to have them pressed, or cleaned and pressed, there is an attendant who receives the clothing, and usually issues a receipt, or makes a record of the fact that certain articles of clothing have been received for processing. The attendant also obtains the processed articles of clothing, and returns them to the customer when the clothing is called for. A system of this nature, while generally satisfactory, is, nevertheless, expensive because it usually requires a full time attendant, and is slow because the attendant can only take care of one customer at a time.

The present invention deals with the foregoing problem, and proposes the provision of an arrangement whereby the attendant referred to is eliminated, and, instead, the customers themselves carry out the operation of checking in the clothing to be processed, and themselves pick up the clothing after it has been processed.

Still further, the present invention provides an arrangement whereby there is no waiting time for any customer, either for depositing clothes, or the like, that are to be processed, or for picking up the clothes, or the like, after they have been processed.

In general, the objectives of the present invention are attained by providing a plurality of double sided lockers, which can be opened from one side by the customer, and from the other side by the various machine operators who carry out the processing of the clothing. In order to conserve space, these lockers are preferably mounted in a circular path, with the customer side toward the outside, and the machine operator's side toward the inside. The processing machine, such as for cleaning and pressing articles of clothing, are arranged inside the circularly arranged lockers and, in this manner, a very compact installation results, which is much more conserving of space than conventional cleaning and pressing establishments.

Still further, the circularly arranged lockers can be interconnected to form a unit which rotates about the centrally located machines, thus making it more convenient for the customers to get to the various lockers, and also make it more convenient for the machine operators to have access to the various lockers, as well as providing for a more or less random and orderly movement of the machine operators inside the circularly arranged compartments.

The present invention proposes to house an arrangement of the described nature in any suitable building structure, preferably a round building structure especially constructed for this purpose, and which may have an outer wall consisting mainly of glass. However, where an existing building provides the necessary space, the arrangement, as referred to above, can be placed therein.

The present invention, in addition to providing more rapid, more convenient, and more economical processing of articles of clothing, also proposes the improvement of providing coin operated locks on the doors on the customer's side of the lockers so that, upon placing the clothes in the locker, the machine operator can effect an adjustment and the clothing can then be retrieved by the customer depositing the proper amount in the coin slots. This eliminates the time and trouble usually encountered in paying for garments when they are picked up in a conventional cleaning and pressing establishement.

For the convenience of both the customers and the machine operators, the lockers may be provided with pins having designations thereon of the work to be done, or there could be nets of different colors provided in the lockers, so that the customer could readily indicate at the time of placing the articles in the locker exactly what work it is desired to have done. This provision for identifying the work operations to be carried out would be a distinct advantage with reference to the machine operators because the movement of the lockers in a rotary path would carry the garments past the various work stations so that they could be readily removed at the proper station depending upon the work to be done on the articles, having the work done, and then returning the articles to the lockers, all at the minimum of effort on the operator's part, and a minimum amount of movement of the operator from his particular work station.

The several objects of the present invention generally designated above, as well as many other objects and advantages thereof, will become more apparent upon reference to the following specification taken in connection with the accompanying drawings, in which:

FIG. 3 is a sectional view indicated by the line III—III on FIG. 2 showing the support from the building frame of the track on which the circularly arranged lockers are suspended, and along which they move, and also showing one of the lockers in vertical cross section.

FIG. 4 is a view looking in at a group of the lockers from the customer side, also showing the supporting track and the supporting rollers for the lockers at the bottom.

FIG. 5 is a plan sectional view taken through one of the lockers, as indicated by the line V—V on FIG. 4.

Figure 1:
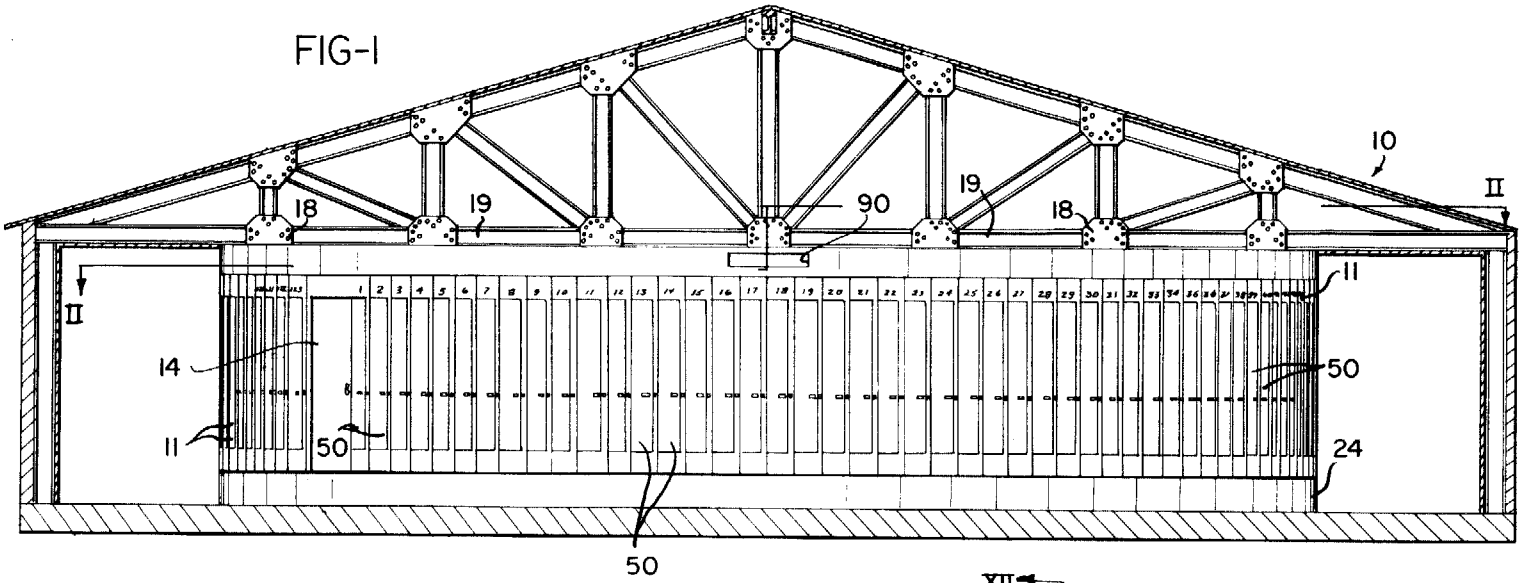
FIG. 1 is a transverse sectional view taken through a building structure, in which there is located a group of lockers arranged in a circular path according to the present invention.
Figure 2:
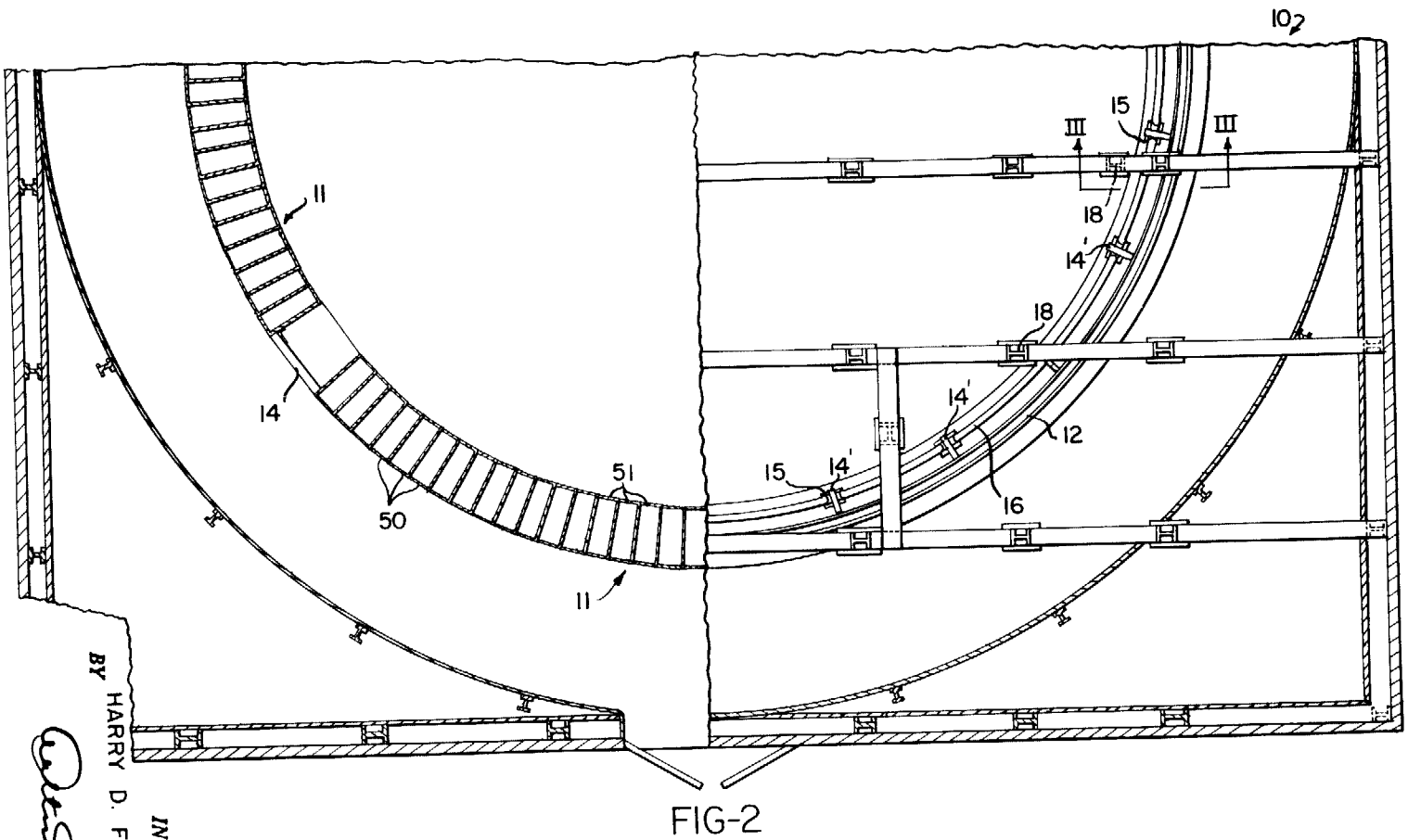
FIG. 2 is a partial plan section indicated by the line II—II on FIG. 1.
Figure 10:
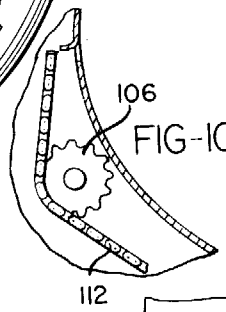
FIG. 10 is a partial plan sectional view indicated by the line X—X on FIG. 9, showing a drive sprocket and drive chain forming a part of the modified drive arrangement of FIG. 8.

Referring to the drawings more in detail, in FIGS. 1 and 2, 10 indicates generally a building structure, which will probably be square or rectangular, if it is an existing building, and will probably be round if made especially to house an arrangement according to the present invention. Located within building 10 are the lockers 11 arranged in a large circular path and interconnected to form a unit. The lockers, for example, may be arranged in side by side relation and connected at the top by a channel member 12 extending completely about the lockers. A similar supporting member 13 may be arranged about the bottom of the circularly arranged lockers and, in this manner, a relatively rigid integral unit is constructed. In addition to the lockers 11, the circular structure will embody one or more access doors 14 through which the machine operators can pass through the circularly arranged lockers and get to the area inside, in which the access machines are located.

FIG. 3 also shows that upstanding from spaced points about the top of the circularly arranged locker structure are the brackets 14' that carry therein the rollers 15 that engage the track 16 which may be, for example, a pipe formed to provide a round track member. This pipe may be welded to spaced support beams 17 that are suspended as by the bracket arrangement 18 from the overhead building structure 19, which may consist of the lower members of the roof trusses or the ceiling joists, or other supporting members secured thereto.

FIG. 3 will also show that there is carried at spaced points about the bottom of the circular locker structure the brackets 20 that carry the rollers 21 that ride on the floor 22 of the building or on a track member carried by the floor. Track members 23 may also include an upstanding outer part 24 that provides a kick plate running around beneath the circular locker structure and which also encloses the rollers 21 and their brackets 20.

Figure 7:
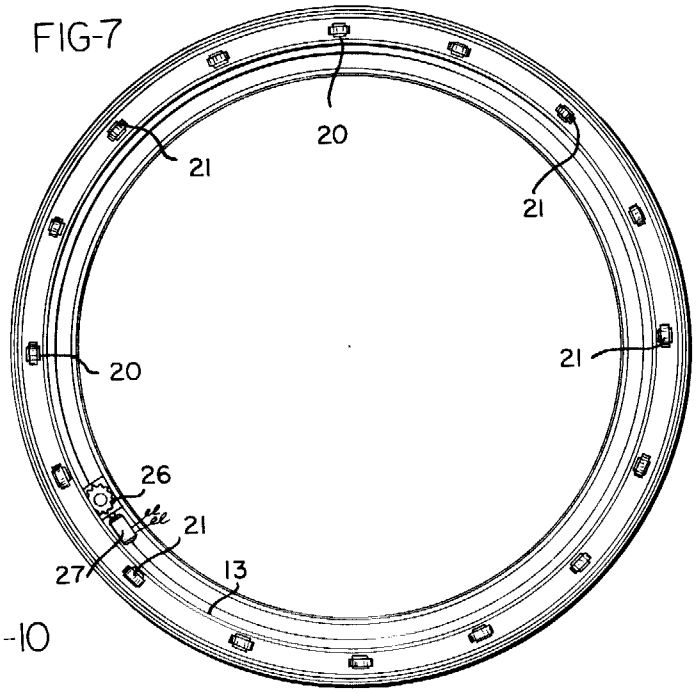
FIG. 7 is a bottom plan view looking up from beneath the circularly arranged lockers provided with a drive arrangement according to FIG. 6.

The spaced relation of the rollers 15 and 21 about the circular locker structure will be seen in FIG. 4, and will also be seen in FIG. 7, which is a bottom plan view of the circular locker structure.

Figure 6:
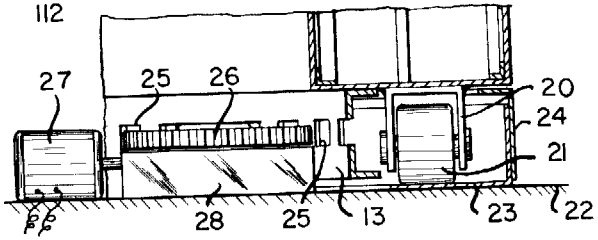
FIG. 6 is a partial vertical sectional view showing one manner of driving the circularly arranged lockers so that they rotate continuously.

For driving the circular locker structure in rotation on supporting tracks 16 and 23, there may be attached to the bottom of the circular locker structure a circular drive member, or this circular drive member may be incorporated directly in channel 13 by providing this channel with uniformly spaced apertures 25 which can be engaged by a drive member, such as a drive sprocket. An arrangement of this nature is illustrated in FIGS. 6 and 7, wherein a drive sprocket 26 is driven by a motor 27 via a speed reducing angle drive 28 so that energization of the motor will result in rotation of the drive sprocket and this will, in turn, provide for a rotation of the circular locker structure on its supporting tracks.

As an example of a particular size which the arrangement so far described might take, the individual lockers 11 might be 9 inches wide on the customer's side and be 24 inches in depth from outer to inner sides, and about 6 feet high from top to bottom. The circular locker structure could be 34 feet in diameter and the corridor outside for the customers would be on the order of about 5½ feet wide. It will be understood, of course, that these particular sizes are merely exemplary, and that they could vary considerably within the scope of the present invention.

Figure 24:
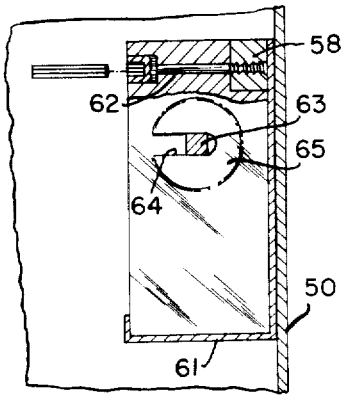
FIG. 24 is a sectional view indicated by the line XXIV—XXIV on FIG. 18 showing the manner in which the lock assembly is arranged for easy detachment from the locker, in case this should become necessary.
Figure 23:
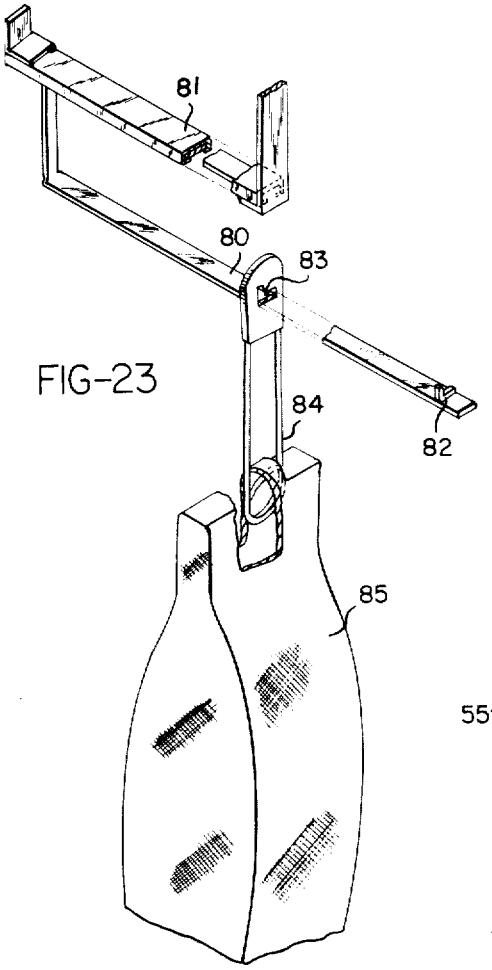
FIG. 23 is a fragmentary perspective view showing the construction of a slidable bar forming a support within each locker for receiving net pins, and which are keyed to the bars.
Figure 25:
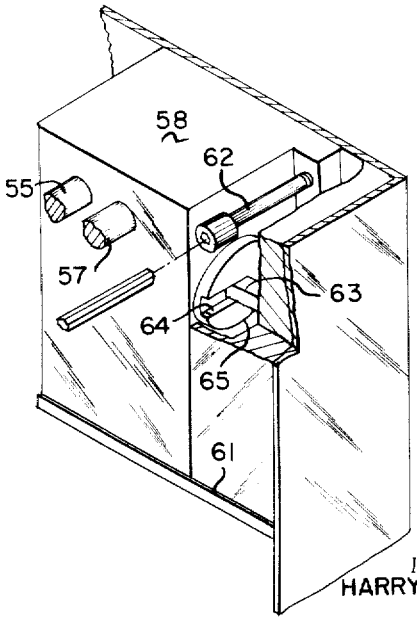
FIG. 25 is a perspective view showing the lock and coin box assembly in perspective and partly broken away showing other details in connection with the construction thereof.

With reference more particularly to the lockers themselves, the construction thereof will be seen in FIGS. 3, 4, 5, 11, 12 and 13, and, with certain details illustrated in FIGS. 23, 24 and 25. These lockers are provided for the purpose of receiving articles of clothing, and the like, that are to be processed, and they are to be inserted in the lockers from the outside of the circularly arranged group of lockers through the customer access doors 50. The inside of each locker also has an access door 51 through which the workers or machine operators can get the clothing or other articles to be processed from the lockers, and return them to the lockers. Each locker is so arranged that it can only be opened from the outside by means of a key so that unauthorized access thereto cannot be had.

Figures 13, 14, 15, 16, 17, 18:
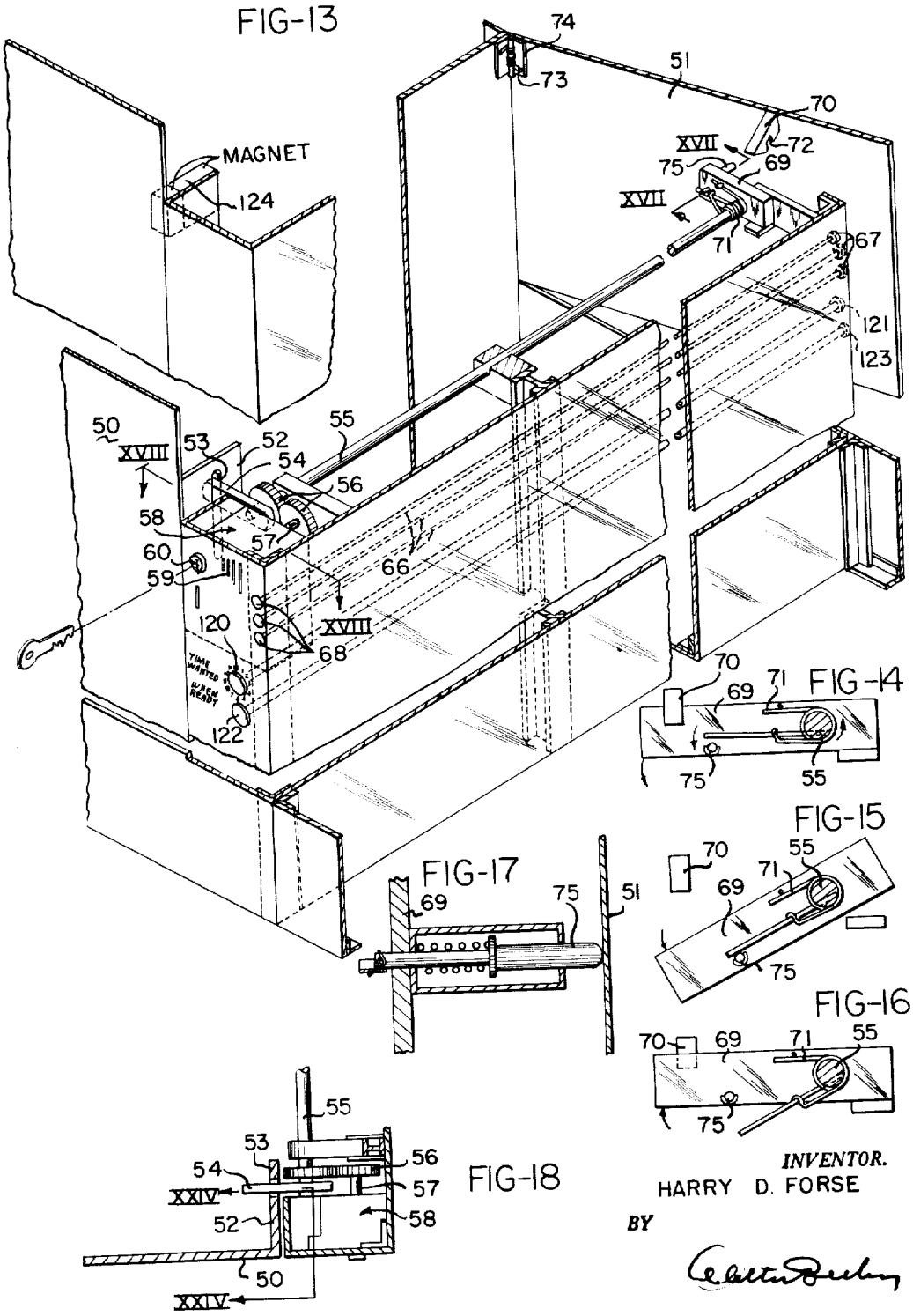
FIG. 13 is a perspective view, partly in section, showing an interlock between the coin operated customer's door and the machine operator's access door.
FIGS. 14, 15 and 16 show a part of the interlock of FIG. 13 in various operative positions.
FIG. 17 is a plan sectional view indicated by the line XVII—XVII on FIG. 13.
FIG. 18 is a plan sectional view indicated by the line XVIII—XVIII on FIG. 13.

While specific details of the coin operated locking mechanism are not disclosed in the present invention, since such units are commercially obtainable, it will be seen, particularly in FIG. 13, that each customer access door 50 is provided on the inside with a flange 52 having a slot 53 for receiving a lock bolt 54 that is mounted on the end of a shaft 55 that is geared as by gearing 56 to a shaft 57 extending into a coin controlled mechanism generally indicated at 58. This coin controlled mechanism is arranged with slots 59 for receiving coins of different denominations, which coins are required to release the mechanism for withdrawing the lock bar 54 in a predetermined amount depending upon the setting of the coin controlled mechanism, which will be explained hereinafter. Associated with the coin controlled mechanism is a key operated locking mechanism 60 which can be actuated by the proper key to drive through the coin operated mechanism to turn shaft 57 when coins in the proper amount have been inserted in the coin operated mechanism.

When first opening the customer access door 50 to deposit clothing therein, a predetermined minimum amount, such as 25 to 50 cents, will be required in the coin operated mechanism before the customer access door can be closed and locked. This amount is, of course, taken into account when the coin operated mechanism is subsequently adjusted to require a certain amount to be deposited therein at the time the customer retrieves the articles of clothing, or the like, that were processed.

According to the present invention, the coin operated mechanism 58, as will be seen in FIGS. 24 and 25, comprises a pocket portion 61 that receives the lower end of the key operated mechanism 60 with the upper end thereof being held in place by removable screw 62, or the like. The key controlled mechanism has a squared shaft 63, or the like, extending out the side toward the coin controlled mechanism, which shaft is receivable in a slot 64 in the actuating member 65 of the coin controlled mechanism. This provides for easy and quick detachment of the key operated mechanism, should it become necessary to change blocks, without the necessity of removing the coin controlled mechanism. Such an occasion might arise, for example, if keys were lost, or if articles placed in the locker were not retrieved by the customer within a predetermined period of time.

The coin controlled mechanism is arranged for being adjusted from the back of the locker by a plurality of shafts 66 extending from the coin controlled mechanism backwardly along one side wall of the locker to a set of dials 67 that are adjusted by the worker or machine operator at the time of returning the articles to the locker. These shafts, in turn, are connected to adjustable dials 68 visible from the customer's side of the locker, and which are graduated to indicate to the customer the amount of coins to be placed in the slots 59 of the coin controlled mechanism to permit the operation of the key operated mechanism to unlock the exterior access door so that the articles therein can be retrieved.

For correlating the operation of the customer access door and the access door 51 at the inside of the locker, the shaft 55 extends to adjacent door 51 and has mounted thereon an arm 69 adapted for cooperation with a latch member 70 carried on the inside of door 51. The arm 69 is biased by spring 71 so that closing of door 51 will cam the arm downwardly, whereupon it will spring upwardly and engage notch 72 of the latch member and retain door 51 locked closed after the clothes have been returned to the locker after being processed and the door 51 is closed.

On the other hand, whenever the customer access door 50 is opened and shaft 55 is turned, arm 69 will move downwardly and disengage from latch 70 and door 51 will move at least part way open under the influence of spring means 73 that may be associated with the hinges 74 of the door, or under the influence of a spring loaded plunger 75 carried by arm 69.

Figure 11:
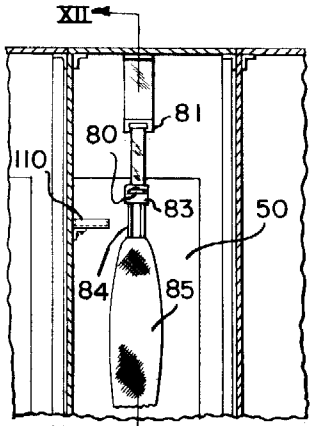
FIG. 11 is a partial vertical sectional view indicated by the line XI—XI on FIG. 3 showing the upper portion of one of the lockers.
Figure 12:
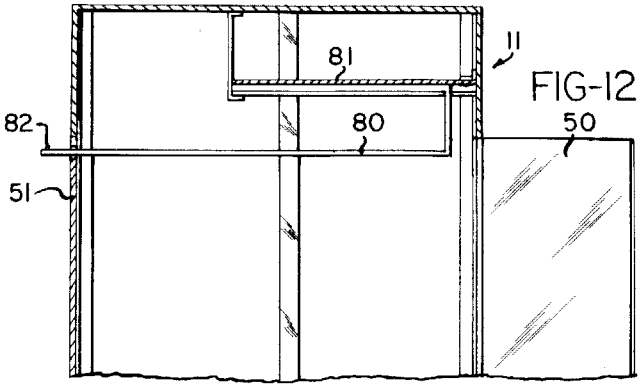
FIG. 12 is a vertical sectional view indicated by the line XII—XII on FIG. 11, showing a sliding bar forming a part of the locker structure, and which is availed of for supporting articles of clothing, or the like, to be processed, or for supporting net bags for receiving the said articles.

FIGS. 11, 12 and 23 show a bar hanger arrangement 80 in the locker than can be employed to advantage, said bar hanger 80 being preferably arranged in a slide 81 so that it can be moved a predetermined distance to facilitate removing of articles of clothing therefrom. Such a bar 80 preferably has a key portion 82 thereon adapted for being received in a correspondingly shaped slot 83 in a hanger pin 84 adapted for receiving a net 85 into which articles of clothing can be placed. As will be seen in FIG. 12, bar 80 preferably extends at least a short distance through the inner door 51 of the locker so that, when the front door is opened, it will not be possible to slide the pins from the bar. However, upon opening the inner door 51, the machine operators inside the circularly arranged locker unit can easily slide the pins from the bar so that the nets can be carried from one machine to another. The provision of the key portions on the bar and pins insures that the pins will always be placed back on the same bars, and, in addition, the pins of the lockers will carry corresponding numbers.

A particularly advantageous arrangement of the nets in the lockers is to provide each locker with nets of varying colors so that the customer can indicate the service desired merely by the selection of a net of a predetermined color, a legend being provided for the customer's use to indicate the particular net to use for any particular purpose. For example, nets of different color could be provided for cleaning only, for cleaning and steaming, for fully finished work and for different types of washing service that might by desired. These nets would preferably be provided in each locker, although it would also be feasible to have the nets available from in front of the lockers with the nets being attached to the pins in the lockers after the net had been selected and the articles to be worked on placed therein.

If the nets are provided in the lockers, the arrangement thereof on the bar hanger or slide would prevent them from being removed from the front of the locker without mutilation, which would discourage attempts to remove the nets.

It might be noted that the bar hangers or slide bars, since they are slidable backwardly in the lockers, can be availed of for hanging garments on the working side of the lockers merely by pulling the bars through the back door a sufficient distance to accommodate hangers, and then the clothing could be hung from the bars in between the processing steps.

The bar hanger can also receive conventional coat hangers, of course, so that suits and coats can be hung in the locker in a conventional manner, if so desired.

Figure 22:
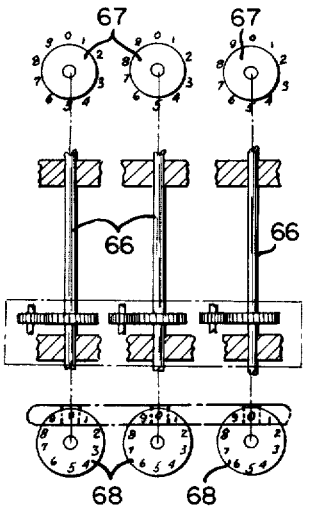
FIG. 22 is a more or less diagrammatic perspective view showing an indicator arrangement that will indicate at any one or a plurality of points about the circularly arranged lockers the direction to take to reach any particular numbered locker by the shortest route.
Figure 21:
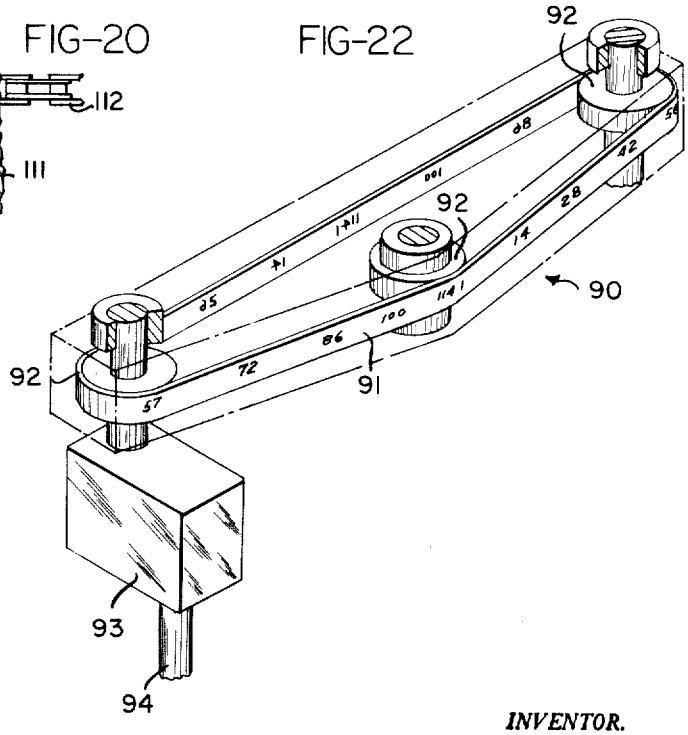
FIG. 21 is a more or less diagrammatic view showing an arrangement whereby the machine operator, at the time of returning the articles to any particular locker, can adjust dials from the operator's side of the locker which will set dials on the customer's side that will indicate the number of coins to be placed in the coin lock before the door can be opened.

For the sake of convenience, there may be provided about the locker structure one or more indicators, as indicated at 90 in FIG. 1, and shown in prespective in FIG. 22. An indicator of this nature would indicate the shortest distance from the indicator to a locker of any particular number. This could be done, for example, by providing a belt or strip 91 bearing indicia in the form of locker numbers. Depending upon whether the particular locker number to be located was toward the right or left of the center portion of the visible part of the strip, the customer would go either to the left or the right about the locker structure to reach the locker.

The strip is mounted on spaced rollers 92, of which at least one is driven through a gear box 93 by a shaft 94 connected with the main drive for the lockers, so that the strip will move in synchronism with the lockers.

The arrangement described above shows a locker arrangement which is suspended from the joists or rafters of the building structure. However, the locker structure could be supported directly on a building floor without any attachment to the overhead structure because the large ring made up of the interconnected lockers would be a relatively rigid and, certainly, a self supporting structure, even in the absence of any supporting track means at the top.

Figure 19:
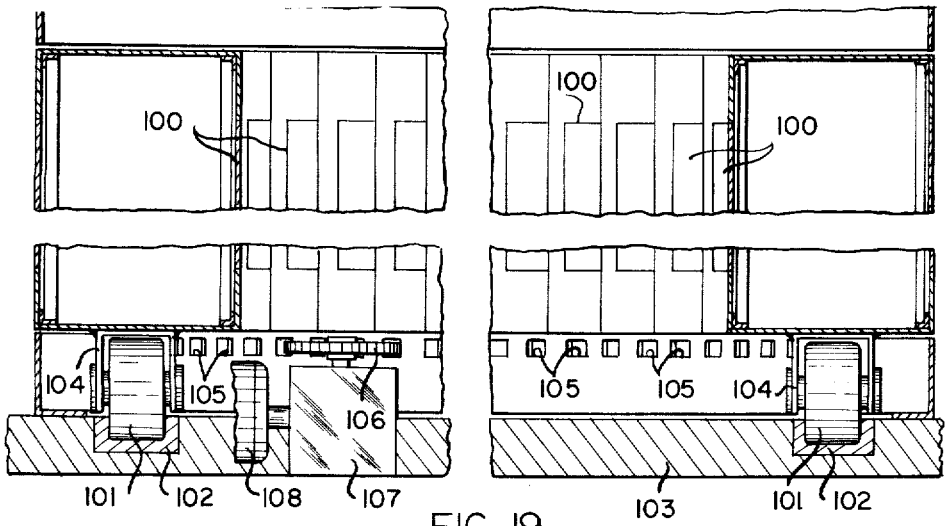
FIG. 19 is a fragmentary sectional view showing a modified structure in which the circularly arranged lockers are supported entirely at their bottoms and do not receive any support from the upper part of the structure.

One such modified arrangement, in which overhead support is eliminated, is illustrated in FIG. 19, wherein a plurality of lockers 100 arranged in side by side relation and interconnected to form the ring of lockers carrying spaced support rollers 101 at the bottom that run in tracks 102 that may be recessed in the floor 103, or may set on top of the floor. The rollers may be supported in a channel 104 having apertures 105 therein engaged by a drive sprocket 106 driven through gear boxes 107 from a motor 108. This arrangement eliminates all overhead connections and merely requires that there be floor space adequate for receiving the circular locker structure in order to put the present invention into practice.

Figure 8:
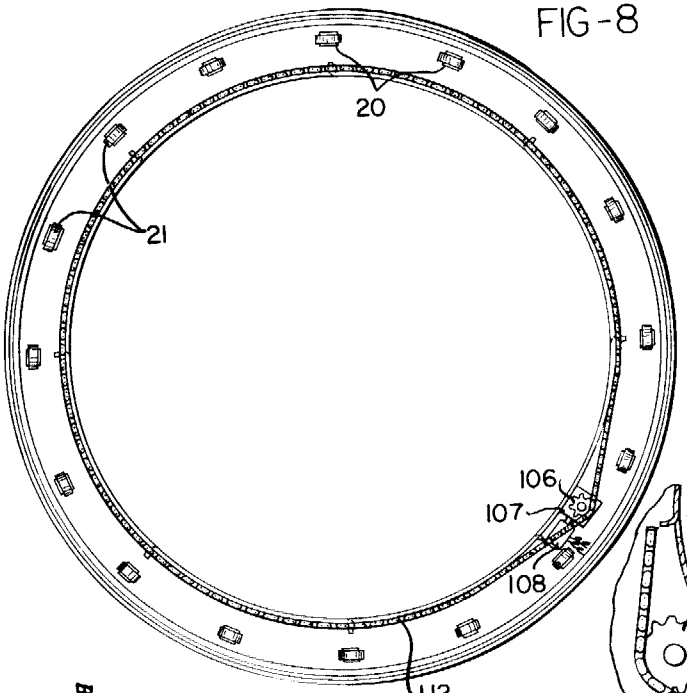
FIG. 8 is a view like FIG. 7 which shows a different drive arrangement for the lockers.
Figure 9:
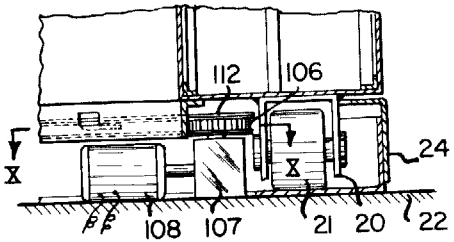
FIG. 9 is a view like FIG. 6, but showing the modified drive arrangement of FIG. 8.
Figure 20:
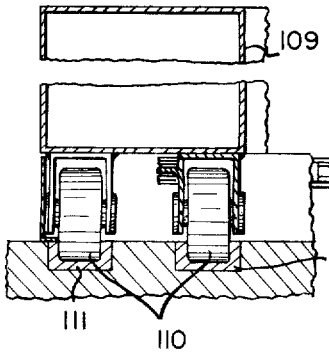
FIG. 20 is a fragmentary view like FIG. 19, but showing a somewhat modified construction.

In FIG. 20, there is shown an arrangement wherein the circular locker structure 109 is provided with pairs of spaced supporting rollers 110 at the bottom running in tracks 111, with there being a drive chain 112 associated with the circular locker structure that is driven somewhat in the same manner as the chain drive illustrated in FIGS. 8 and 9.

It has been mentioned that the space inside the locker ring is to be availed of for receiving the machinery and other equipment necessary for the entire processing of clothing and other articles in the lockers.

Accordingly, it will be understood that some planning of the placement of this equipment and machines would be necessary in order to provide for the best working conditions.

Such arrangements can easily be arrived at by those skilled in the art so that the lockers will move past the working stations in an orderly manner, whereby, wherever possible, it is only necessary to remove the articles from the locker at a certain station, and then place them back in the locker or on the bar hanger in the locker so that they can be conveyed to the next station, thereby requiring the smallest amount of movement of the machine operators from their working stations, and the smallest amount of movement of the clothing or other articles, all leading to a highly efficient operation.

It will be understood that many refinements could be introduced into the described arrangement, such as the provision on the lockers of a dial settable by the customer to indicated the time it was desired to have the work finished, and which dial would be connected with another on the inside of the locker so that the same indication would be given on the working side of the locker, thereby permitting the workers to process first the clothing and articles that had to be done in the shortest possible time.

Also, a corresponding indicator could be arranged in the locker so that, whenever the work was completed and returned to the locker, a signal would be provided on the exterior side of the locker to indicate that the work was completed and ready to be picked up.

In the drawings, 120 shows an indicator that the customer can set indicating when he wishes the clothing to be ready and this is connected to a corresponding indicator 121 visible from the inside so the machine operators can be guided accordingly.

To indicate when the articles are ready to be picked up, there may be an indicator 122 visible from the customer's side which may be a light, or a dial, that is connected with an actuator 123 on the inside.

Since the customer's door is only unlocked at the time of retrieving clothing and is only locked after clothing is placed in the locker, the said door may be unlocked a good bit of the time and, for this reason, there is preferably a spring 125 urging the door toward its closed position and there may further be provided a magnet 124 for holding the door closed so that it does not stand part way open.

In opertaion, a customer would select a locker having a key in it. He could open the door and place the clothing in the locker and then close the door, and, upon placing a coin of a predetermined denomination in the coin controlled unit, the door could be locked and the key removed. Such coin controlled units are known and one is illustrated, for example, in the United States Patent No. 2,861,667.

Upon locking the customer door, the inner access door will automatically open slightly to indicate that there is work in it to be processed.

After processing the work and replacing it in the locker, the dials are adjusted to indicate the cost of the work and to show that the work is ready to be picked up and the inner door is then closed and it will latch in its closed position thus showing that it does not contain any work to be done.

Upon retrieving the clothing, the customer will place the required number of coins in the coin operated unit which will be required to release the lock in which the number of coins will be calculated to allow for the coin originally placed in the mechanism to release the key. Thereupon, the customer access door can be opened and the clothes retrieved.

While there has been illustrated and described an arrangement in which a coin device is employed for controlling the unlocking of the customer's access door, it is also feasible, as well as practical, to dispense with this relatively complicated coin device, and utilize, instead, a simple coin operated lock for the customer's locker door, such as is employed with baggage lockers in train depots, and the like.

With an arrangement of this nature, there could be provided within the locker a coin tray, as indicated by reference numeral 110, in FIG. 5, which is merely a very shallow tray attached to the inside of the locker at one side. The customer would place the right amount of money in this tray, or a greater amount, and, when the clothes were completed and placed back in the locker on the working side of the locker, the proper change would be placed in the coin tray. This would be a considerably simpler structure than one utilizing a presettable coin operated lock, and, in most instances, would provide a satisfactory structure.

From the foregoing, it will be evident that the present invention provides for a novel arrangement and a method for handling and processing clothing, and similar articles, in a highly efficient manner, and requiring the fewest attendants and the least amount of handling of the clothing, and relieving the customer and the processing establishment of the time consuming necessity of bulky garment storage, and the handling of money, and similar inconveniences.

It will be evident that the method and apparatus of the present invention may be modified substantially as to particular details to adapt it to varying circumstances and conditions, and it will be understood that it is desired to comprehend within the purview of the present invention such modifications and adaptations as fall within the scope of the appended claims, or within the spirit of the present invention.

What I claim is:

1. An arrangement for the handling and processing of articles of clothing and the like through such operations as cleaning and pressing; first means at a first region for accommodating personnel and equipment for carrying out the said operations on said articles, second means at a second region for accommodating customers, a plurality of lockers in side by side relation interposed between and separating said regions, said lockers being tall relative to the width so as to receive clothing on hangers, an access door in each locker opening into said first region so the said personnel can remove articles therefrom for processing and return articles thereto after processing, a key operated access door on each said locker opening into said second region whereby customers can place articles in the lockers for processing and remove articles from the lockers after processing, and coin controlled means pertaining to said key operated access door for controlling the unlocking thereof, said lockers being arranged in a path so as completely to isolate said first region from said second region, and said second region extending along the said lockers so access can freely be had to any one thereof with respect to said key operated access doors only.

2. An arrangement for the handling and processing of articles of clothing and the like through such operations as cleaning and pressing; first means at a first region for accommodating personnel and equipment for carrying out the said operations on said articles, second means at a second region for accommodating customers, a plurality of lockers in side by side relation interposed between and completely separating said regions, said lockers being tall relative to the width so as to receive clothing on hangers, an access door in each locker opening into said first region so the said personnel can remove articles therefrom for processing and return articles thereto after processing, a key operated access door on each said locker opening into said second region, whereby customers can place articles in the lockers for processing and remove articles from the lockers after processing, and coin controlled means pertaining to said key operated access doors for controlling the unlocking thereof, said lockers being arranged in a closed path surrounding said first region and said second region completely surrounding the said lockers so access can freely be had to any one thereof, there being at least one personnel access door incorporated in said plurality of lockers for movement of personnel to and from said first region.

3. An arrangement for the handling and processing of articles of clothing and the like through such operations as cleaning and pressing; first means at a first region for accommodating personnel and equipment for carrying out the said operations on said articles, second means at a second region for accommodating customers, a plurality of lockers arranged side by side in a [circular] *closed* path surrounding and completely enclosing said first region, said lockers thereby forming a single unit, said lockers being tall relative to the width so as to receive clothing on hangers, each locker having an access door opening into each region, and means for supporting the entire locker unit for [rotation about the central axis of the unit] *movement along said path.*

4. An arrangement for handling and processing of articles of clothing and the like through such operations as cleaning and pressing; first means at a first region for accommodating personnel and equipment for carrying out the said operations on said articles, second means at a second region for accommodating customers, a plurality of lockers arranged side by side in a [circular] *closed* path surrounding and completely enclosing said first region, said lockers thereby forming a single unit, said lockers being tall relative to the width so as to receive clothing on hangers, each locker having an access door opening into each region, and means for supporting the entire locker unit for [rotation about the central axis of the unit] *movement along said path,* there being drive means drivingly associated with said unit energizable for driving [it in rotation] *the same along said path.*

5. An arrangement for the handling and processing of articles of clothing and the like through such operations as cleaning [the] *and* pressing; first means at a first region for accommodating personnel and equipment for carrying out the said operations on said articles, second means at a second region for accommodating customers, a plurality of lockers arranged side by side in abutting relation forming a circular locker unit surrounding and completely enclosing said first region, said lockers being tall relative to the width so as to receive clothing on hangers, each said locker having an access door opening into said first region and also having a key operated access door opening into said second region, means supporting said unit for rotation about a vertical central axis, and drive means associated with said unit for driving the unit in rotation.

6. An arrangement for the handling and processing of articles of clothing and the like through such operations as cleaning and pressing; first means at a first region for accommodating personnel and equipment for carrying out the said operations on said articles, second means at a second region for accommodating customers, a plurality of lockers arranged side by side in abutting relation forming a circular locker unit surrounding and completely enclosing said first region, said lockers being tall relative to the width so as to receive clothing on hangers, each said locker having an access door opening into said first region and also having a key operated access door opening into said second region, means supporting said unit for rotation about a vertical central axis, and drive means associated with said unit for driving the unit in rotation, said support means comprising a stationary circular track above the unit, hanger means movably carried by the track and attached to the top of the unit at spaced points thereabout, and supporting roller means secured to the bottom of the unit in circumferentially spaced relation.

7. An arrangement for the handling and processing of articles of clothing and the like through such operations as cleaning and pressing; first means at a first region for accommodating personnel and equipment for carrying out the said operations on said articles, second means at a second region for accommodating customers, a plurality of lockers arranged side by side in abutting relation forming a circular locker unit surrounding and completely enclosing said first region, said lockers being tall relative to the width so as to receive clothing on hangers, each said locker having an access door opening into said first region and also having a key operated access door opening into said second region, means supporting said unit for rotation about a vertical central axis, and drive means associated with said unit for driving the unit in rotation, said supporting means comprising a circular track means beneath the circular locker unit, and supporting roller means attached to the bottom of said circular locker unit in circumferentially spaced relation and engaging said track means.

8. In combination; a plurality of clothing lockers arranged side by side in a [circular] *closed* path and interconnected to form a unit, means supporting said unit for [rotation about a vertical central axis] *movement along said path,* drive means connected with the unit for [driving it in rotation] *moving the same along said path,* each locker having a first access door opening toward the inside of the unit and a second access door opening toward the outside of the unit, said second access door having a key operated lock mechanism, a coin controlled unit associated with said lock mechanism, and means operable from the inside of said locker unit for adjusting each said coin controlled unit to predetermine the coins that must be placed therein to permit operation of the key operated lock mechanism.

9. In combination; a plurality of clothing lockers arranged side by side in a circular path and interconnected to form a unit, means supporting said unit for rotation about a vertical central axis, drive means connected with the unit for driving it in rotation, each locker having a first access door opening toward the inside of the unit and a second access door opening toward the outside of the unit, said second access door having a key operated lock mechanism, a coin controlled unit associated with said lock mechanism, means operable from the inside of said locker unit for adjusting each said coin controlled unit to predetermine the coins that must be placed therein to permit operation of the key operated lock mechanism, and indicating dial means at both sides of each locker for indicating the coins that are to be placed in the coin controlled unit to release the key operated lock mechanism, said indicating dial means being connected with the adjusting means for said coin controlled units.

10. In a clothes locker; a generally prismatoidal enclosure, access doors on two opposite sides of said enclosure, a hanger bar on the locker, said hanger bar having a short leg carried by the locker at the top and having a longer horizontal leg beneath said short leg and connected thereto, one of said doors having an aperture aligned with the bar, one end of the longer leg of the hanger bar extending at least slightly through said aperture in said one of said access doors so that, upon opening of the other access door, the said one end of said longer leg of said bar remains inaccessible, the legs being connected adjacent the other end of said longer leg.

11. In a clothes locker; a generally prismatoidal enclosure, access doors on two opposite sides of said enclosure, a hanger bar in the locker, said hanger bar having a short leg carried by the locker at the top and having a longer horizontal leg beneath said short leg and connected thereto, one of said doors having an aperture aligned with the bar, one end of the longer leg of the hanger bar extending at least slightly through said aperture in said one of said access doors so that, upon opening of the other access door, the said one end of said longer leg of said bar remains inaccessible, the short leg of said bar being slidably supported in said locker for sliding movement outwardly of said one access door to facilitate the removing of articles thereon, such as hanger devices adapted for receiving articles of clothing or net bags, or the like.

12. In a clothes locker; a generally prismatiodal enclosure, access doors on two opposite sides of said enclosure, one of said access doors being coin operated for customer use, and the other access door being for the use of operators that are to process clothing that is in the locker, a hanger bar in the locker extending horizontally therein and having one end extending at least slightly through said other access door and having its other end extended upwardly and connected to the top of the locker immediately inside said one door, so that articles slidably mounted on the bar can be removed slidably only from the said one end thereof, a plurality of nets for receiving clothing to be processed, support elements on said nets surrounding said bar and slidably carried by said hanger bar, and said nets being of respectively different colors for indicating the type of work operation to be carried out on clothing placed in the said nets.

13. In combination; a plurality of colthes lockers, said clothes lockers having coin operated access doors for customers on one side and operators' doors on the other side, a hanger bar in each locker, a plurality of nets on each hanger bar in each locker, said bar having one free end only and extending through the operator's door, said nets being removable from the hanger bars from said one end only, a pin connecting each net with its pertaining hanger bar, each pin having an apertured support element slidable on the pertaining bar, and each hanger bar and the aperture in each pin pertaining thereto being of such corresponding cross section that each pin is receivable on only its pertaining hanger bar, and the several nets in each said locker being of respectively different colors for indicating the type of work operation to be performed on articles of clothing placed in the respective nets.

14. In combination; a plurality of clothing lockers arranged side by side in a path and interconnected to form a unit; confining a working region on one side of the unit and defining an access region on the other side of the unit separated from the working region by the unit, each locker having a first access door opening toward the working region side of the unit and a second access door opening toward the access region side of the unit, said second access door having a key operated lock mechanism, a coin controlled unit associated with said lock mechanism, means operable from the working region side of said locker unit for adjusting each said coin controlled unit to predetermine the coins that must be placed therein to permit operation of the key operated lock mechanism, and indicating means at both sides of each locker for indicating the coins that are to be placed in the coin controlled unit to release the key operated lock mechanism, said indicating means being connected with the adjusting means for said coin controlled units.

15. An arrangement according to claim 1 which includes adjusting means operable from said first region only for adjusting each coin controlled means to predetermine the coins that must be placed therein to permit operation of the locking mechanism thereof.

16. An arrangement according to claim 15, which includes indicating means on at least the access door side of each locker connected with said adjusting means and operable to indicate the coins to be placed in the coin controlled means as determined by the setting of said adjusting means.

References Cited by the Examiner

The following references, cited by the Examiner, are of record in the patented file of this patent or the original patent.

UNITED STATES PATENTS

| | | |
|---|---|---|
| 1,222,963 | 4/1917 | Matchette. |
| 1,309,911 | 7/1919 | Pease. |
| 1,327,771 | 1/1920 | Ogden. |
| 1,475,149 | 11/1923 | Smith. |
| 2,100,212 | 11/1927 | Ferrer. |
| 2,338,324 | 1/1944 | Floyd. |
| 2,658,667 | 11/1953 | Mirkin. |
| 2,991,866 | 7/1961 | James et al. |

ROBERT B. REEVES, *Primary Examiner.*

S. H. TOLLBERG, *Assistant Examiner.*